United States Patent [19]

Villanueva et al.

[11] 4,249,084
[45] Feb. 3, 1981

[54] SCHEME FOR HARNESSING HYDROUNDULATORY POWER

[76] Inventors: Juan T. Villanueva, 105 Apo St., Sta Mesa Heights, Quezon City; Manuel I. Felizardo, 156 Luna Mencias St., San Juan, Rizal, both of Philippines

[21] Appl. No.: 927,089

[22] Filed: Jul. 24, 1978

Related U.S. Application Data

[63] Continuation of Ser. No. 704,867, Jul. 13, 1976, abandoned.

[30] Foreign Application Priority Data

Oct. 8, 1975 [PH] Philippines ............................... 17638

[51] Int. Cl.² ............................................. F03B 13/12
[52] U.S. Cl. ...................................... 290/53; 417/331
[58] Field of Search ..................................... 290/42, 53; 417/330–333; 60/497, 498, 505; 9/8 R

[56] References Cited

U.S. PATENT DOCUMENTS

| 644,093 | 3/1900 | Place | 417/331 |
|---|---|---|---|
| 1,962,047 | 6/1934 | Young | 60/497 |
| 3,126,830 | 3/1964 | Dilliner | 417/331 |
| 3,487,228 | 12/1969 | Kriegel | 290/53 |
| 3,515,889 | 6/1970 | Kammerer | 290/53 |
| 3,988,592 | 10/1976 | Porter | 417/330 |

FOREIGN PATENT DOCUMENTS

| 19999 | of 1899 | United Kingdom | 60/497 |
| 504166 | 4/1939 | United Kingdom | 9/8 R |

*Primary Examiner*—J. V. Truhe
*Assistant Examiner*—W. E. Duncanson, Jr.
*Attorney, Agent, or Firm*—Sughrue, Rothwell, Mion, Zinn and Macpeak

[57] ABSTRACT

By means of Water Wave Power acting upon floats, attached to and made part of mechanical contrivances devised within the context of this invention for which the name of HYDRO-UNDULATORY POWER ARRESTERS has appropriately been chosen, water surrounding the structure is to be pumped positively or forcefully and continuously at that, to locations higher in elevation than the level of the water in the basin where the devices are installed or against a water system which comprises one or more hydro-pneumatic tanks, so that summarily the entire scheme would amount to the building up of potential hydrostatic energy at the expense of Water Wave Power, which under present circumstances is not utilized at all but simply allowed to go to waste.

The release of the potential energy of the water thus built up and kept in storage in a reservoir at high elevation or within hydro-pneumatic tanks as aforementioned is an already known PRIOR ART on power generation which for obvious reasons has no place in an application for letters patent exclusively dedicated to absolutely new or novel art, and if the hydro-electric power plant which is PRIOR ART is included for electric power generation, it is so done only as an accessory function to obtain our objective of "CONVERTING WATER WAVE POWER INTO ITS MECHANICAL and ELECTRICAL COUNTERPARTS."

7 Claims, 17 Drawing Figures

SCHEME FOR HARNESSING HYDROUNDULATORY POWER

This is a continuation of application Ser. No. 704,867, filed July 13, 1976, now abandoned.

BACKGROUND OF THE INVENTION

This invention relates to the artificial creation of conditions favorable to the generation of hydro-electric power, which up to the present period have entirely been dependent upon natural or God-given economical sources, our proposition being to harness the inherent power of water waves so universally abundant in the open seas and large lakes of the world, simply to be wasted upon reaching break water installations and shores of adjoining lands.

Ever since Man has learned and mastered how to harness water power effectively and with practical and technological considerations and approach regardless of whether the conditions encountered required high or low head development work, he has solely depended upon the availability of the combination of favorable data provided exclusively by nature for and within the scope of the sites of the projects. In fact, to this date, Man has been absolutely dependent on natural conditions in planning hydro-electric power plants.

In order to plan economically any such project under present conditions he has to tediously gather for a good number of years data on the flow of the streams he wants to harness which upon properly plotting will graphically yield him valuable information known as hydrographs, in the absence of any other means available at his disposal to create conditions fitting his project.

The ability to economically set up the conditions exactly and precisely as desired, a scheme still unknown to the World up to this writing, with the view to servicing hydro-electrical power plant projects, precluding thereby absolute dependency upon nature, is the essence and main purpose of this invention dedicated to the outline of a means leading to the design, construction and utilization of our "HYDRO-UNDULATORY (OR WATER WAVE) POWER ARRESTERS."

SUMMARY OF THE INVENTION

The main purpose or objective of this invention is to present a "SCHEME FOR HARNESSING HYDRO-UNDULATORY POWER" which in plain language, means a scheme whereby the almost endless or interminable energy available in the waves of the seas and large lakes would be arrested and stored as potential energy for release back as kinetic energy upon demand in the form of mechanical power and therefrom into electrical power for the sevice of Man.

A second benefit derivable from this invention is the means of providing for a very economical source of water which although not sanitary for human as well as plant and animal consumption and domestic uses in general, yet would undoubtedly be sufficiently and satisfactorily good for such public services as fire fighting, harmless riot and mob dispersion and general cleaning of benches and seats of parks (provided said parks are devoid of plants which might be affected by salt water), sidewalks, streets, stagnant water canals septic vaults etc. which under present conditions consume costly, sediment-freed, aerated, filtered, and chlorinated fresh water.

A third benefit following the successful operation of this invention is the artificial neutralization with minimal expense of the effect of gravity upon liquids in general. In the case of water for instance, which abounds on our planet, its natural tendency is to flow downwards from its source whether it be rainfall or what gushes forth from a spring or snow or ice in the process of melting-wherefrom it finds its way through gutters and artificial waterways and canals, creeks, streams, rivers and even lakes, consistently following a course which will finally lead it to the sea. Water evaporation followed by precipitation as rain or snow is the only way in which nature provides for the return of the water back to the elevated sources from whence it came.

A fourth benefit obtainable from this invention is the creation of new industries that would result from the establishment of aquaria and fish ponds at levels higher than the seas or lakes from where the water has been transferred by the devices of our herein invention, for the economic development and caretaking of all forms of aquatic flora and fauna useful to man for the purpose of their isolation from their natural predators, increasing and enhancing thereby their multiplication and growth.

The practical realization of the schemes outlined in our herein invention is very significant, because it would mean the utilization of practically an almost unlimited source of water wave power and energy available from seas and lakes, at some reasonable distance from the coastlines of continents and islands, where continuous and uninterrupted undulatory activity exists all throughout the whole year, which will lead to steady and unfailing supply of electric current by the hydro-electric generating units installed in power plants erected as conversion plants, served by the water wave pumping units pertaining to the schemes.

The novel features of our herein invention are set forth in the claims thereof. The invention itself, however, both as to the construction of the devices and methods of their operation, together with additional objects and advantages obtainable therefrom, will appear clearly crystallized in the minds of the reader from the description of specific embodiments which could best be understood with proper reference to drawings and illustrations hereto appended all of which properly classified and numbered are duly described and outlined in a list within the section which follows.

BRIEF OUTLINE OF DRAWINGS AND ILLUSTRATIONS

The following is a list of the drawings pertaining to this invention:

FIG. 1 Schematic lateral view of the hydro-undulatory power conversion system as proposed.

FIG. 2 Plan view of the power plant as part of the hydro-undulatory power conversion system.

FIG. 3 Lateral view or elevation of an ideal or theoretical version of the hydro-undulatory or water wave power arrester.

FIG. 4 Lateral view or elevation of a practical single acting water wave power arrester for use against high heads.

FIG. 5 Detail emphasizing the water intake and outlet connections to the pipe cylinder 4 shown in FIG. 4 as well as the Ball-and-socket joint connecting the closed bottom end of said pipe cylinder 4 to a Ferro concrete foundation 20 at the floor of the sea or lake whereupon the entire structure of THE PLUNGER-RAM-PUMPED-EQUIPPED HYDRO-UNDULATORY (OR WATER WAVE) POWER ARRESTER is installed.

FIG. 6 Plan view of a single hydro-undulatory or water wave power arrester showing quadrangular system of mooring.

FIG. 7 Side elevation showing partially a multiple installation of hydro-undulatory or water wave power arresters, tied up together and with extreme arresters in anyone line of them moored to bases or foundations.

FIG. 8 Plan view of the multiple installation of hydro-undulatory or water wave power arresters as depicted in side elevation in FIG. 7.

FIG. 9 Lateral view of a PLUNGER TYPE HYDRO-UNDULATOR OR WATER WAVE POWER ARRESTER, showing the relation between the cylinder, the plunger, the connecting rod and the ball-and-socket joint fastened to the bottom of the hull of the buoy or floating vessel.

FIG. 10 Enlarged view of the section through the ball-and-socket joint showing details of the assembly of the parts which make up the joint consisting of the "ball" fastened to the tip of the plunger or its extension or connection rod and the enveloping "socket" shell halves incorporated with the bottom of the buoy or floating vessel.

FIG. 11 Isometric view of the Pipe Cylinder and super-structure connection inclusive of the installation upon the ball-and-socket point securely mounted upon the main massive ferro-concrete foundation at the bottom of the sea.

FIG. 12 A section of the elevation or lateral view of the embodiment of the ball-and-socket joint at the bottom of each plunger type hydro-undulatory (or water wave) power arrester unit, incorporating with it, the passageway of the effluent therefrom.

FIG. 13 Plan view of the embodiment of the ball-and-socket joint at the bottom of each plunger type hydro-undulatory (or water wave) power arrester unit as seen in elevation in the preceding drawing vis. FIG. 1.

FIG. 14 A view in linear perspective of a MULTIPLE HYDRO-UNDULATORY OR (WATER WAVE) POWER ARRESTER installation inclusive of the power conversion plant, Water Storage Reservoir and the Cross Country Electrical transmission lines system leading to industrial centers where the electric current generated will be used.

FIG. 15 PRIOR ART: for reference purposes only in introducing the structure of the NEW BUOY for attachment to the hydro-undulatory or Water Wave Power Arrester appearing in Elevation or lateral views.

FIG. 16 PLAN OR BIRDSEYE OR TOP VIEW of the NEW BUOY to be attached to the Hydro-Undulatory or Water Wave Power Arrester.

FIG. 17 The NEW BUOY to be attached to the Hydro-Undulatory or Water Wave Power Arrester in Elevation or in lateral view, to correspond to what is shown in the preceding drawing—that is to say FIG. 16.

Similar numbers in all the drawings identify the same component part or devices within the embodiment of the hydro-undulatory or water wave power arrester—the apparatus for which letters patent is hereby being sought and applied for.

Description of Preferred Embodiments and Details of Novel Arts

General

Figure 1:
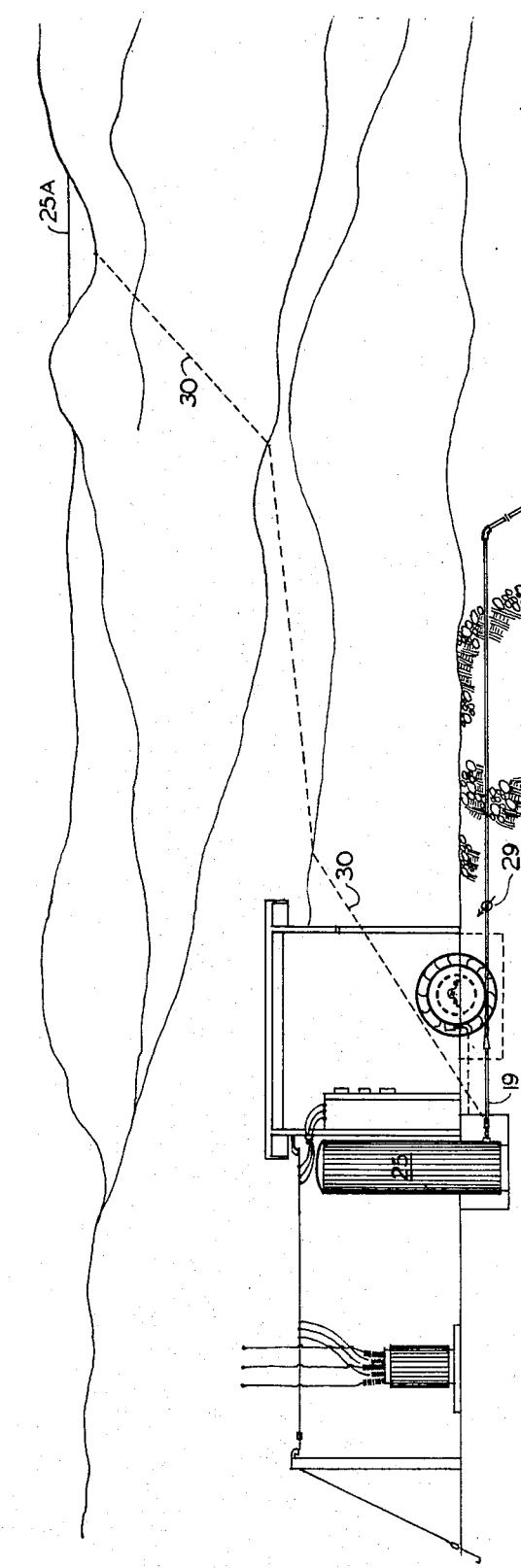
Figure 2:
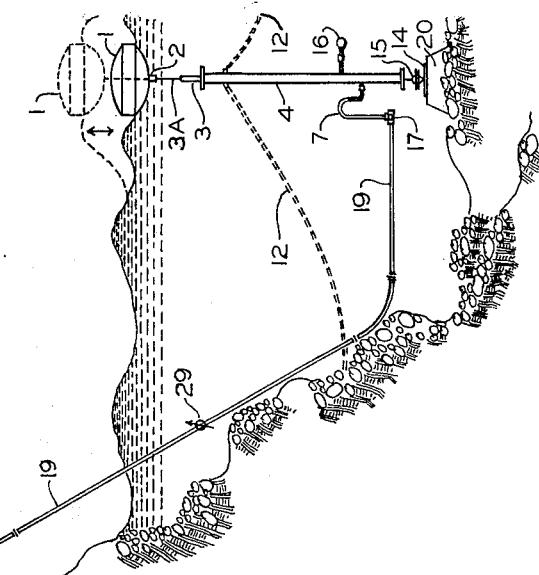
Figure 2:
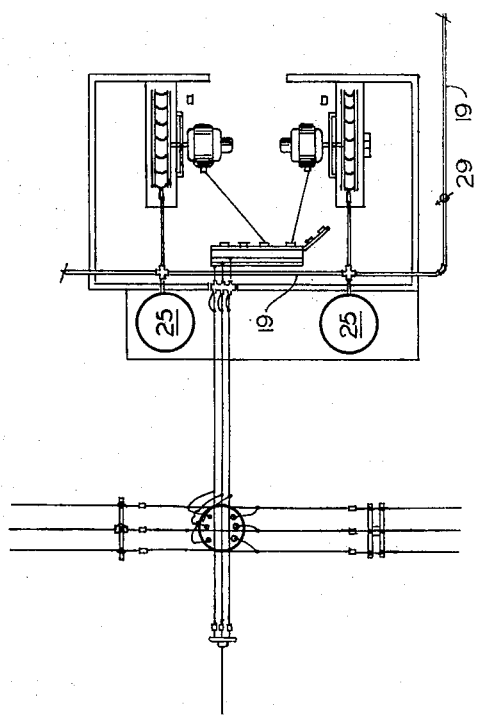

The contrivances conceived within the embodiments of the hydro-undulatory or water wave power arrester aside of the Water Wave Power Arrester itself, lead to a thorough description as well as discussion of the following because of their importance in this application for letters patent namely 6/1. The HYDRO-UNDULATORY OR WATER WAVE POWER DETECTOR ARRESTER as a whole;

6/2. The BUOY or FLOAT As the instrument of detection and arrest of hydro-undulatory or water wave power;

6/3. The "PUMP" ATTACHED TO THE HYDRO-UNDULATORY or Water Wave Power Arrester and Detector as the instrument for the storage and accumulation of hydrostatic or potential Water energy;

6/4. Adaptation of Universal BALL AND SOCKET JOINTS in the embodiment of the Hydro-Undulatory or Water Wave Power Arrester.

6/5. The Specific System of MOORING of HYDRO-UNDULATORY OR WATER WAVE POWER ARRESTERS.

This section of the specification which bears directly on the WATER WAVE POWER ARRESTER or its constituents is specially featured in FIGS. 1, 2, 6, 7, 8, 9, 10, 11, 12, 13, 14, 16 and 17. FIG. 15 describes PRIOR ART outfits in preparation of an introduction of a new design and shape of the BUOY in order to accomplish its role in the new set up.

6/1 The Hydro-Undulatory or Water Wave Power Detector and Arrester

A casual observation of the waves of the sea, and of large lakes as well, for that matter, without neglecting the behavior of the ships and floating vessels thereupon, will reveal the following phenomena and facts:

1st. The existence of an interminable sequence or train of water waves and ripples as long as the wind or a persistent breeze exists;

2nd. All along the sea coasts of continents and large islands as well as the shores surrounding large lakes, the water waves are smaller when the wind blows away from the land towards the open sea or lake, than when the wind is directed from the latter towards the shore.

3rd. Ordinarily in any shore bordering the sea or lake, the wind blows from the land to the sea or lake during a fraction of the day. Reversal of the direction of the wind occurs also during another fraction of the day and the remaining portion of the day, represents periods of absolute calmness;

4th. As an exception to the first, second, and third observations as recited there are also locations where the waves are always enormous, capable therefore to be exploited for power arrest and extraction at any time.

5th. Any vessel which happens to be floating on the sea or a large lake, upon being tossed by the waves has two movements, namely 1st. a rolling motion which is what causes sea sickness to passengers not used to sea or lake travel; and 2nd. a hopping motion up and down of a vessel or float due to its riding upon the waves which alternate its position from wave crests to wave troughs.

Pondering on the aforementioned observations, we are faced with the reality that water wave power which has originated from wind power is presently being absolutely wasted.

On the other hand, at the present state of things, the erection of a hydro-electric power plant, depends largely if not entirely upon what Nature has to offer in the matter of requirements of the plant such as stream flow, the head that can be built up to back the said flow through the turboelectric units of the plant, the terrain formation for planning the enclosure of the headworks etc. which means that generally speaking man has to depend entirely upon Nature and as such his choice of site for the economic development of his plan is only secondary to what nature can offer. At the moment he cannot create artificially the conditions that only nature can make available.

The two aforementioned circumstances of present day real life would seem to be correlative in that the problem of one, apparently might find solution in the other. To be concrete about the subject the above statement could be made to read thus—"the availability of wasted water wave power could be developed to create potential sources of energy that only Nature can at present provide."

Upon this possibility rests the basis of our present invention which simply consists in using hydro-undulatory or water wave power to create conditions for the economic generation of water power.

Referring to FIGS. 1 to 14 of the drawings hereof it will be observed that, if a BUOY which ordinarily is moored to a foundation at the bottom of the sea or simply anchored thereto, is fastened instead through a Universal joint, to a piston or plunger rod of a vertically installed reciprocating PUMP duly designed for the purpose, whose cylinder is pivotally pinned to a "ball and socket" joint fastened to a solid base in the bottom of the sea or lake, then the movements of the water waves could be taken advantage of, by arresting the power therefrom in order to move the reciprocating pump which will force the sea or lake water of the surroundings up, to a reservoir or to hydro-pneumatic tanks either or both of which could be made the source of the water supply to hydro-electric power plants. The fact that water wave power is in reality the prime mover of the Hydro-Undulatory Power PUMP, makes replenishment of the source of Power highly economical.

It might be argued against such an arrangement the undeniable fact that there are periods of absolute tranquility of the sea or lake, where the BUOY is installed during which, water delivery for water storage would become practically "nil."

To this undeniable fact we advance the equally undeniable truth that calmness of the waters of the sea as well as of the lakes adjoining land is not permanent. In this regard, there are always waves which although might appear relatively small in size yet would still be capable of causing some pumping to be performed, no matter how slight. Moreover between periods of calmness there are always periods of roughness of the waters of the sea which will compensate for the periods of idleness or slow rates of water transfer by the pumps.

The projected conditions will decidedly be better than those of present day occurence when replenishment of water supply is made possible only by rainfall or snow fall up in the mountains.

Moreover, the fact that the capacity as well as the extension of HYDRO-UNDULATORY pumping installations are flexible, because there is no limit as to the number of HYDRO-UNDULATORY power arrester units which could be assigned to any one of them, would lead to the conclusion that our proposition, far from being simply speculative and theoretical in nature, is absolutely practical and reliable of realization, so that conversion of water wave power into electric power as outlined would appear conclusively possible.

Ordinarily, the set up would have been outlined with the view leading to the outright and instantaneous conversion of water wave power into electric power. Nevertheless, in the solution of the problem we preferred to consider therefor the possibility of taking advantage of the kinetic energy existing in the water waves of the sea or lakes for building up potential energy of water otherwise known as hydro static energy, which upon release through PRIOR ART schemes involved in hydro-electric power plants would be reconverted back into mechanical and electrical power ON DEMAND by the combined industrial and domestic needs of the communities served by the Plants.

In short, in our present consideration analysis and study of the problems of transformation of water wave power into electricity, the element of time has purposely been set aside, in order to give way to the consideration of simply the storage of energy with the view to securing not only availability of power at any particular moment but the continuity thereof all the time.

Incidentally, there is a similarity between our proposed set up to that of the winding of a spring of a toy or a clock, whereby wave power corresponds to the winding of either the toy or clock, whilst the functioning of the toy or the clock represents the operation of the hydro-electric power plant generating electric power for the use of Man.

Figure 14:
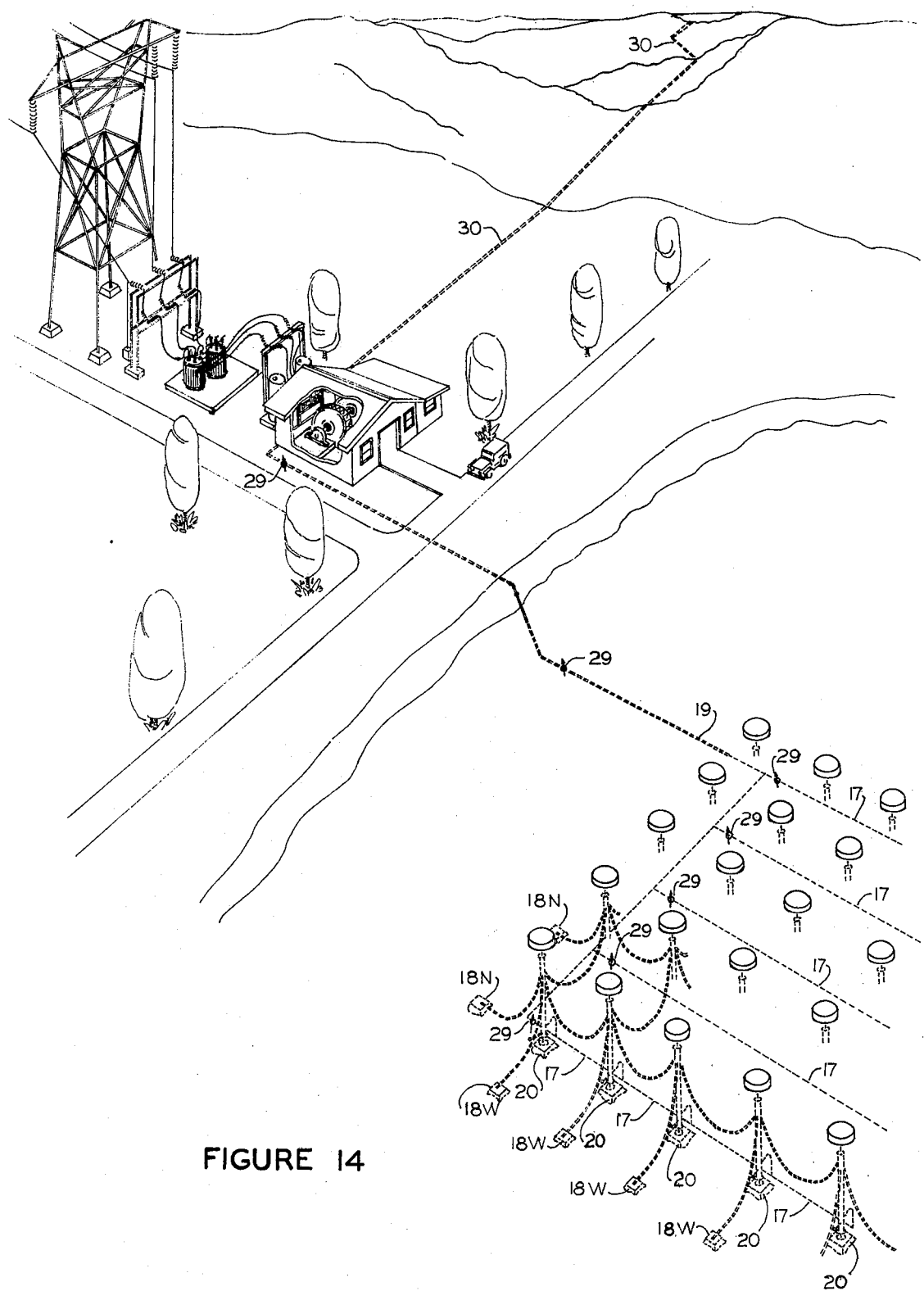
Figure 15:
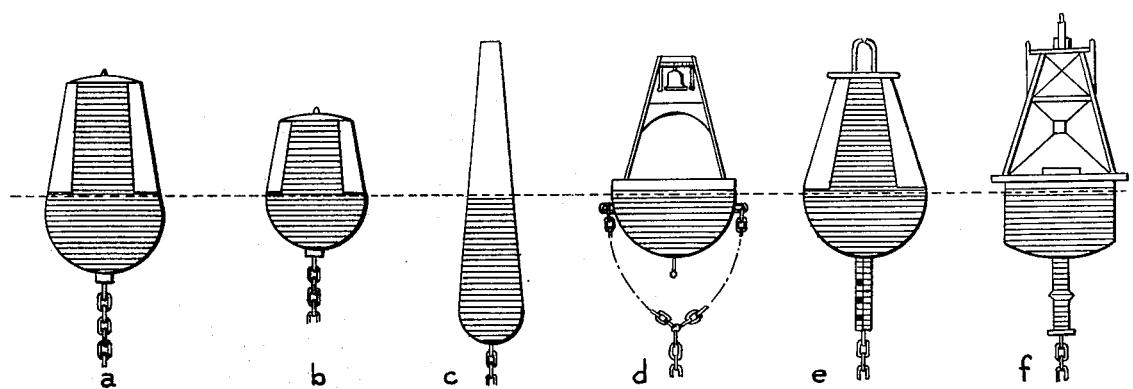

Viewing the project with regards to our herein invention, reference is hereby invited towards FIGS. 1 and 14, in the realization of the fact that as long by a train of large waves keep on rolling over the surface of the sea or a lake they will cause any vessel floating thereupon to rock to the extent of even tossing it up and down, tilting it sidewise in all directions. Either Buoy 1 or 1a could well be such a vessel. With the socket made up of its component halves 23 and 24 of a universal "ball and socket" joint attached to its bottom, encasing "ball" 2 of the joint on to which terminates extension rod 3A to pump plunger ram 3, while on the other hand cylinder 4 is held at rest except for limited pivotal leaning about ball 13 encased in-between socket halves 14 and 15 of a second universal "ball-and-socket" joint fastened down by means of Bolts-and-Nuts 21 to a massive immovable ferro-concrete foundation 20 at the bottom of the sea or lake where the HYDROUNDULATORY POWER ARRESTER is installed, then it would appear obvious that while the Buoy 1 is being rocked around, its regular up and down movements would be transmitted to the plunger 3 activating thereby the pump for the task it is destined to perform.

Since the piston or plunger ram pump is by nature of design and construction, positive in performance viz. definite, unyielding and constant in operation due to the incompressible properties of all liquids, it will therefore force the water out through its discharge valve 9 to any practical height desired, or against any pressure for that matter, provided the ratio between the total weight of the buoy 1 and the weights of the plunger ram 3, and the plunger rod 3A taken altogether, to the area of the cross section of the plunger ram is kept greater than the intensity of pressure corresponding to the net total dynamic or delivery head against which the pump is to work, and provided further that the pump and the entire piping system therefrom to the Power Conversion Plant on firm ground beyond the seashore of lakeshore are properly balanced in design so as to be structurally strong enough to be able to resist the strain caused by the pressure equivalent to the total dynamic or delivery head involved.

Figure 16:
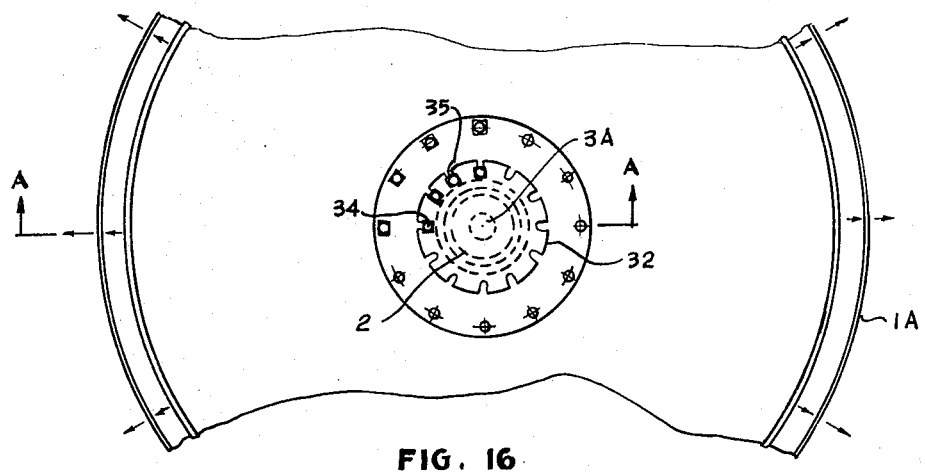

To insure the condition decribed hereinabove as shown in FIG. 16, a manhole 31 with manhole cover 32 and rubber or plastic gasket 32-A have been provided for insertion of the necessary ballast load that will increase the weight of the whole embodiment of the Arrester composed of the improved buoy 1-A, the connecting rod 3-A, the plunger 3 and the universal ball and socket joint between the buoy and connecting rod, so that the total unsupported weight would be capable of pushing down the plunger 3 against the total dynamic force which is numerically equal to the intensity of pressure which in turn is equivalent to the total Dynamic Head against the plunger 3 multiplied by the area of the circular crossection of said plunger 3.

The foregoing paragraphs have described what in essence is the general outlay of the scheme of converting water wave power into electric power wherein as will be seen our HYDRO-UNDULATORY (OR WATER WAVE) POWER ARRESTER inclusive of the parts thereof such as the novel BUOY 1-A and the vertically installed RECIPROCATING PUMP thereto connected, not to mention other devices within which the embodiment of the finished machine, play very important roles.

Finally changes have being introduced in the case of the buoy which will be explained in detail in the next section which corresponds thereto.

The Buoy or Float as the Instrument of Detection and Arrest of Hydro-Undulatory (or Water Wave) Power.

Dictionaries and encyclopaedias in general define the Buoy as a floating object in the seas and lakes, duly anchored so as to prevent its wandering around with the sole function, at least to the date of this application, of warning sailors, seamen and marine crews of the approach and proximity of ingresses to channels, or the existence of invisible rapids, or of shoals or submerged rocks as well as reefs etc. or in short, obstacles which could or would be dangerous to navigation.

In this application for invention letters patent, it is proposed to add a new, yet equally as important and useful a function and mole to the buoy, especially designed therefor, so as to detect and arrest hydro-undulatory or water wave power, so very vital and important a task indeed for the effective operation and accomplishment of the invention, for which letters patent is herein being applied for.

Up to the time of this writing, buoys have been classified into six known types, namely—(a) the NUN buoy; (b) the CAN buoy; (c) the SPAR buoy; (d) the BELL buoy; (e) the WHISTLING buoy; (f) the LIGHT EMITTING buoy, whose lighting was originally caused by the burning of liquid or gas fuels but lately in many cases the light flashing has been resorted to by electric current supplied by storage batteries.

Although the aforementioned buoys are all known to be PRIOR ART, nevertheless they are all grouped together within FIG. 15 of the drawings from (a) to (f) in order to emphasize the alterations introduced so as to emerge as the new BUOY 1-A from the conventional ones known at present; the new BUOY 1-A being designed purposely for driving HYDRO-UNDULATORY POWER ARRESTERS.

In general it could be admitted that at least in so far as our herein invention is concerned the buoy is the instrument by which means water wave energy is intended to be detected and arrested. The conventional Buoy 1, typically representing most buoys known to this date, is sluggish in reacting to water wave action. The SPAR buoy featured in FIG. 15c which apparently is the only discordant illustration depicting Buoys known to this date in so far as hull body shape is concerned, is expected to even show greater sluggishness in responding to water wave action, because of its elongated vertical form which cannot but show deficiency in buoyancy, compared to the other known buoys.

In order for the buoy, as is known today, to be able to perform its task or function effectively and with the highest attainable efficiency, it must have to suffer alterations, the most outstanding of which being one leading to the increase of its sensitivity to the presence and the actions as well of the water waves over which it will ride.

To attain such a goal, one innovation would be to augment the reach of the Buoy without increasing at all its depth, as result of which its buoyancy could be largely enhanced.

Figure 17:
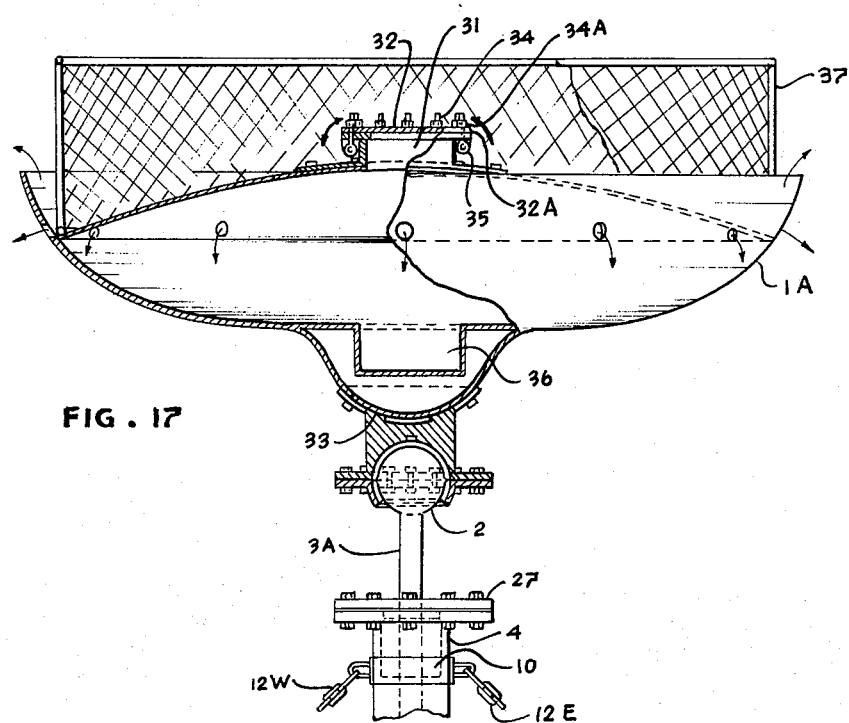

With the original and conventional Buoy appearing as Buoy 1 in most of our drawings herewith, the projected enlargement would mean an increased diameter, over what is outlined by its circular water line, as result of which out of the original conventional Buoy 1, Buoy 1-A will emerge as a new, much bulkier vessel yet still remaining as shallow as it originally was, and perhaps even shallower as is exclusively featured in FIGS. 16 and 17 of the drawings. The new BUOY 1-A will cover many more waves than what the old Buoy 1 could ever be expected to cover.

The lateral view of the new BUOY 1-A, shown in FIG. 17 observed from any angle around it, will give the impression of a boat or ship, except for its round configuration in plan or to be more precise, its cylindrical shape, so that any horizontal cut through it at any level will show the outline of a circle.

The projected elevation of the NOVEL BUOY - 1-A when seen from any angle around it, simulating a cruising vessel or ship would suggest the existence therewith of a keel under its hull. The absence thereof, however is very prominent. Nevertheless such a detail is to be expected, considering the universally accepted practice followed in the design and construction of Buoys at least up to this writing.

Instead of the Keel, a Bulge or Protuberance 33 is provided at the bottom of the hull, wherefrom the "split socket" of a Universal "ball and socket" joint will be attached, ready to grasp or embrace the "ball" of the joint, which is attached to the terminal end of the piston or plunger rod 3A of the reciprocating PUMP - a component part of the HYDRO-UNDULATORY POWER ARRESTER which is as important as the NOVEL BUOY 1-A itself presently under discussion.

The protuberance, hump or bulge 33 at the very center of the Hull of the NOVEL BUOY 1-A will produce an opposite configuration within the same hull which will serve as space 36 for the storage of "Ballast"

- meaning to say, such additional weighting as might be formed necessary to add to the embodiment of the Buoy proper and the "Plunger Ram" or the "Piston and Rod Combination" and the Universal "ball and Socket" joint unit connecting them, all of which being parts of the HYDRO-UNDULATORY POWER ARRESTER so as to overcome or prevail over all opposit on to the delivery of water against the high heads involved or the utilization of the kinetic power of the water waves for the creation, accumulation and storage of hydrostatic or potential energy of water.

The Pump Attached to the Hydro-Undulatory Power Arrester The pump as constituent of our HYDRO-UNDULATORY or WATER WAVE POWER ARRESTER is vital to the operation of the latter, inasmuch as without it the conversion of the Water Wave Power into mechanical and electrical power as conceived by us would not be possible. All the drawings appended to this application for letters patent except FIG. 15 feature either the PUMP as a whole or some important detail thereof.

Figure 4:
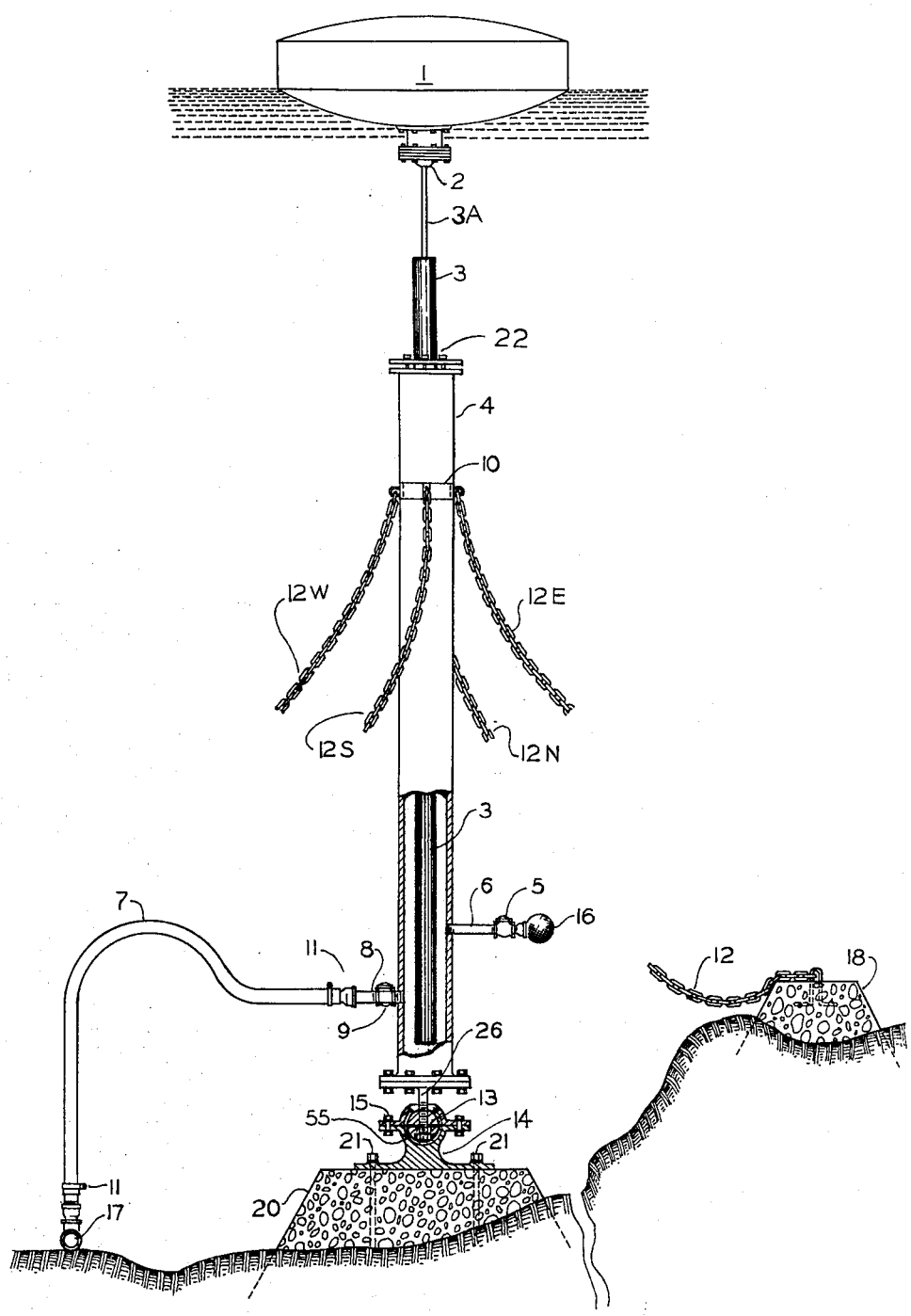

FIG. 4 features a practical design of the pump which will require minimal attention. It shows the pipe cylinder 4 of the pump pivotally hold by a universal "Ball and Socket" joint of which the "ball" 13 is enclosed between "socket halves 14 and 15" which while being held together are fixedly fastened to a massive ferro-concerete foundation 20 so as to render them and the entire socket embodiment unit of the joint absolutely motionless.

With the arrangement as described, the only motion possible for the pipe cylinder 4 is to swing or lean about "ball" 13 of the Universal "ball and socket" joint aforementioned within the limits permissible by the mooring lines holding the pipe cylinder by means of clamping rings 10 almost at its upper end, slightly below the location of the stuffing box 22 into which plunger 3 is inserted and is caused to move up and down in order to effect the pumping operations of the outfit, impelled by the action of the water waves upon BUOY 1-A, whose improvements and innovations over the present day BUOY 1, typically featured in the various forms and shapes appearing under FIG. 15, from a to f, have been duly described in a previous article 6/2 page 18 hereof.

It would suffice to say that BUOY 1-A, has been endowed with such a buoyant spread and shape so as to enable it to rise up quickly while riding to the crest of any water wave encountered by it, and bringing up with it aside from its own weight, the weight of the Ball and Socket Joint 2 which connects it to the extension rod or stem 3A, in addition to the weight of the latter and the weight of plunger ram 3.

The uppermost position is attained when the driving Improved Novel Buoy 1-A riding upon any one of the series of waterwaves reaches the crests thereof. It is then poised to be brought down because of the void under it, when the upward stroke of the Plunger ram 3 would cause sea or lake water (whichever be the case) surrounding the HYDRO-UNDULATORY POWER ARRESTER concerned, to be drawn in from the immediate vicinity of the pump through strainer 16, into the intake valve 5 which as a check valve (or one-way flow retaining valve) will not allow the water to flow back to the sea or lake during the downward stroke, while forcing the effluent out of the pump through the exit or outlet check valve (or one-way flow retaining valve) thereof. 6:4: Adaptation of Universal "ball and socket" Joints in the Embodiments of the Hydro Undulatory or Water Wave power arrester.

Universal joints that will show flexibility at any angle would appear indispensable in the device intended for conversion of Hydro-Undulatory or Water Wave Power into electric power. The simplest and best adaptable universal joint for the scheme herein being proposed is the "Ball and Socket" type of joint not only because of its inherent compactness of design but also because of its adaptability of application to the entire outfit.

The first application of the "Ball and Socket" joint is where the piston or plunger rod 3A connects with the Buoy 1 of the joint with the "ball" of the joint so arranged as to be the terminal end of the plunger of piston rod 3A. The necessity of maintaining freedom of movement of the buoy is very important to enable it to respond to the impulses and movements of the water waves. This feature makes necessary the absence of unnecessary attachments which could impede freedom of motion within the mechanism of the entire embodiment of the HYDRO-UNDULATORY OR WATER WAVE POWER ARRESTER maximizing thereby absorption by the BUOY of whatever power that might be available from the water waves.

Figure 3:
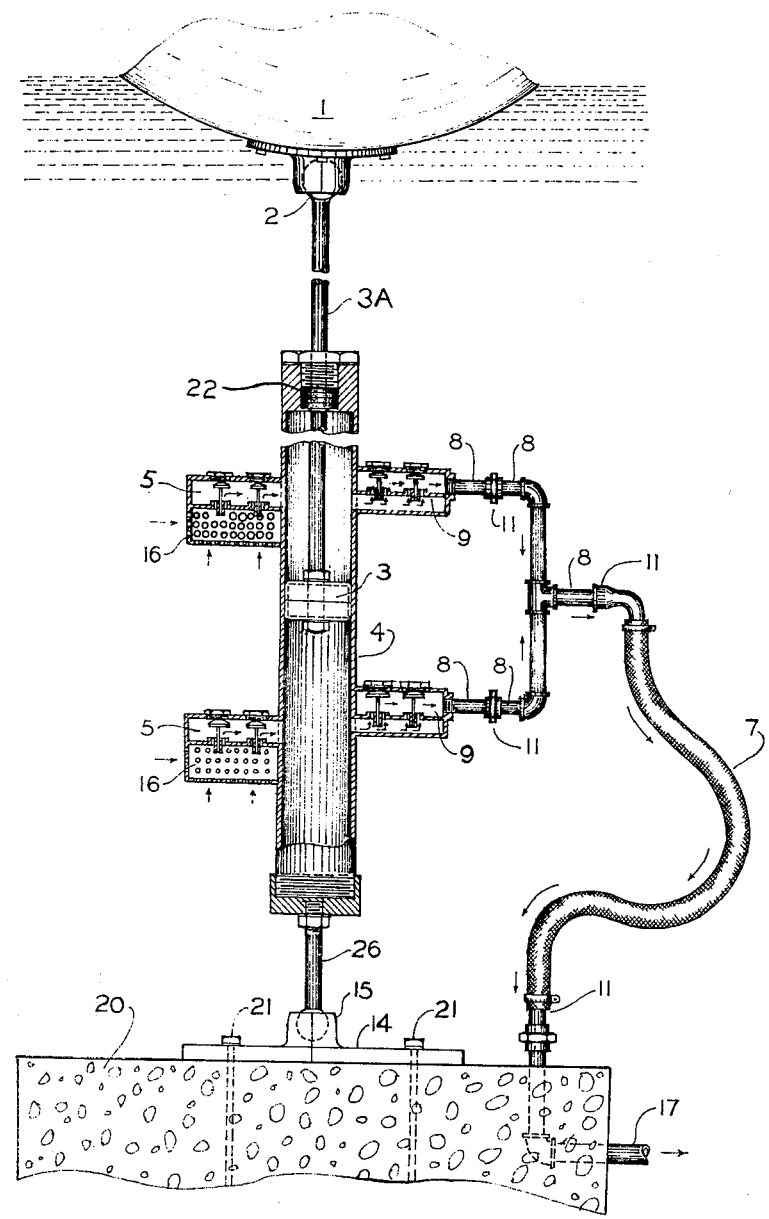

Referring particularly to FIGS. 3 and 4, Ball 2 can be considered as the terminal extension of the Plunger rod 3A to which it is connected while being encased between half socket 23 which is rigidly attached to the BUOY 1 and its companion, detachable half socket cap 24 which upon being fastened to the fixed half socket 23 aforementioned, by means of bolts and nuts located all around the flanges of the half sockets would result in the fully assembled socket embracing so to say "ball" 2 of the joint.

Another useful location within the embodiment of the HYDRO-UNDULATORY OR WATER WAVE POWER ARRESTER where the "Ball and Socket" Joint finds a useful and appropriate not to say indispensable application, is where the pipe cylinder of the "PLUNGER PUMP" connects to the base or the ferro-concrete foundation of the entire embodiment of the "Arrester" such as featured in FIGS. 1, 4, 7, 11, 12 and 14 and most likely the extension to the ideal double-acting, piston pump shown in FIG. 3.

Because of the heavy load called for by the weight of the entire superstructure making up the entire HYDRO-UNDULATORY OR WATER WAVE POWER ARRESTER, the universal ball-and-socket joint at this second location as indicated cannot but be many times larger than the first "Ball and Socket" Joint which connects buoy 1 and the piston or plunger pump connecting rod 3A, whose only function is simply to transmit the power absorbed by the buoy to the PUMP, with minimal hold of the buoy so as not to be in the way of its absorption of water wave or hydro-undulatory energy.

The ball and socket joint at this second location, where the hydro-undulatory pipe cylinder 4 or perhaps its extension 26 is fastened to its ferro-concrete foundation 20 at the floor of the water basin concerned (be it the sea or lake where the hydro-undulatory or water wave power arrester is installed), could be very simple such as where the water effluent is absolutely independent thereof as featured in FIGS. 1, 3, 4, 5, 7, 11, and 14.

Figure 12:
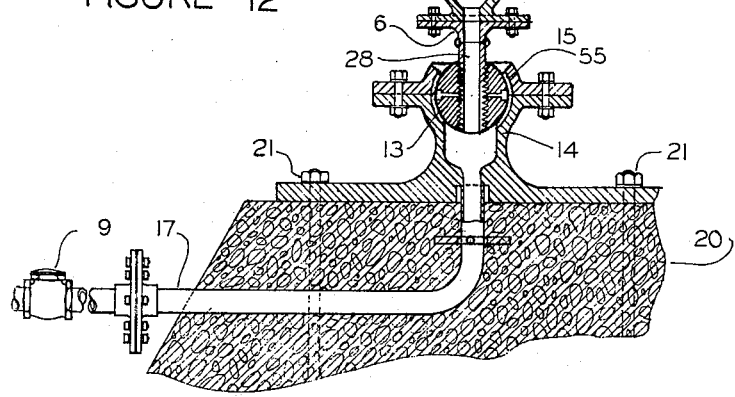

On the other hand the connection could be made somewhat complicated, such as is suggested in FIG. 12 where it is meant to combine the inherent "flexibility"

of the "Ball and Socket" joint with the provision of a passageway of the effluent from the power arrester to the pipe network leading to the power conversion plant and reservoir on firm land beyond the sea or lake shoreline. Any of the two schemes will allow limited leaning in all directions about ball 13 of the Universal Ball and Socket Joint at the bottom of the entire Hydro-Undulatory or Water Wave Power Arrester structure so as to be able to meet changes following tidal varsations.

Finally, a significant feature in connection with the use of the Universal Ball and Socket Joint in this application for Letters Patent on Hydro-Undulatory on Water Wave Power Detector and Arrester is the innovation consisting in the insertion of wooden layers of "LIGNUM VITAE" lumber as antifriction lining between the surface of the "ball" and "socket halves" of the joint.

This feature is believed very important, not to say absolutely necessary in order to provide for adequate lubrication of the joints which would permanently remain immersed under water while performing their functions.

The scheme follows sound marine engineering practice such as is followed in the case of the journals for the shafting of screw propellers in the mechanical propulsion of steamships and motor boats, not to mention other present day applications of similar nature.

6/5 Specific System of Mooring

The requirement that the PLUNGER PUMPS of the HYDRO-UNDULATORY POWER ARRESTERS be held as much as possible vertically erect, demands adequate mooring of the ARRESTER PUMP COLUMNS to either terminal mooring posts laid at the floor of the sea or between themselves, using sturdy corrosion resistant chains or steel wire ropes.

Absolute freedom of movement of the BUOY, short of the simplest method of connection to the Arrester Pump as devised, so as to avoid any restraint to its motions leads to the absolute absence of mooring lines to the BUOY, fastening being exclusively limited to keeping the Plunger Ram pipe cylinder columns vertically standing, while being pivotally hinged by means of "ball and socket" universal joints to the massive ferro-concrete foundation laid at the bottom of the sea. Such an arrangement will permit limited leading of the ARRESTER PIPE CYLINDERS, keeping them relatively erect regardless of tide variations.

All terminal bases of foundations intended for mooring the HYDRO-UNDULATORY POWER ARRESTERS are to be so located that the crossing of mooring lines fastened to them shall be at least when viewed in plan, at right angle or ninety degrees displacement with respect to each other. This is graphically featured in FIGS. 6 and 8 of the drawings.

Figure 6:
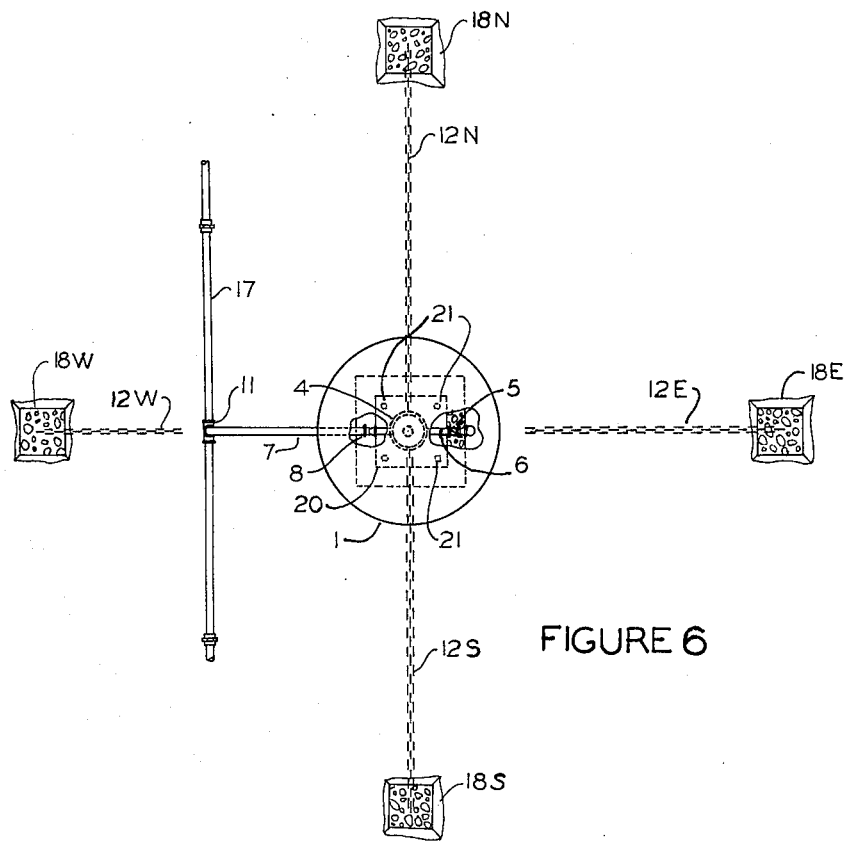
Figure 7:
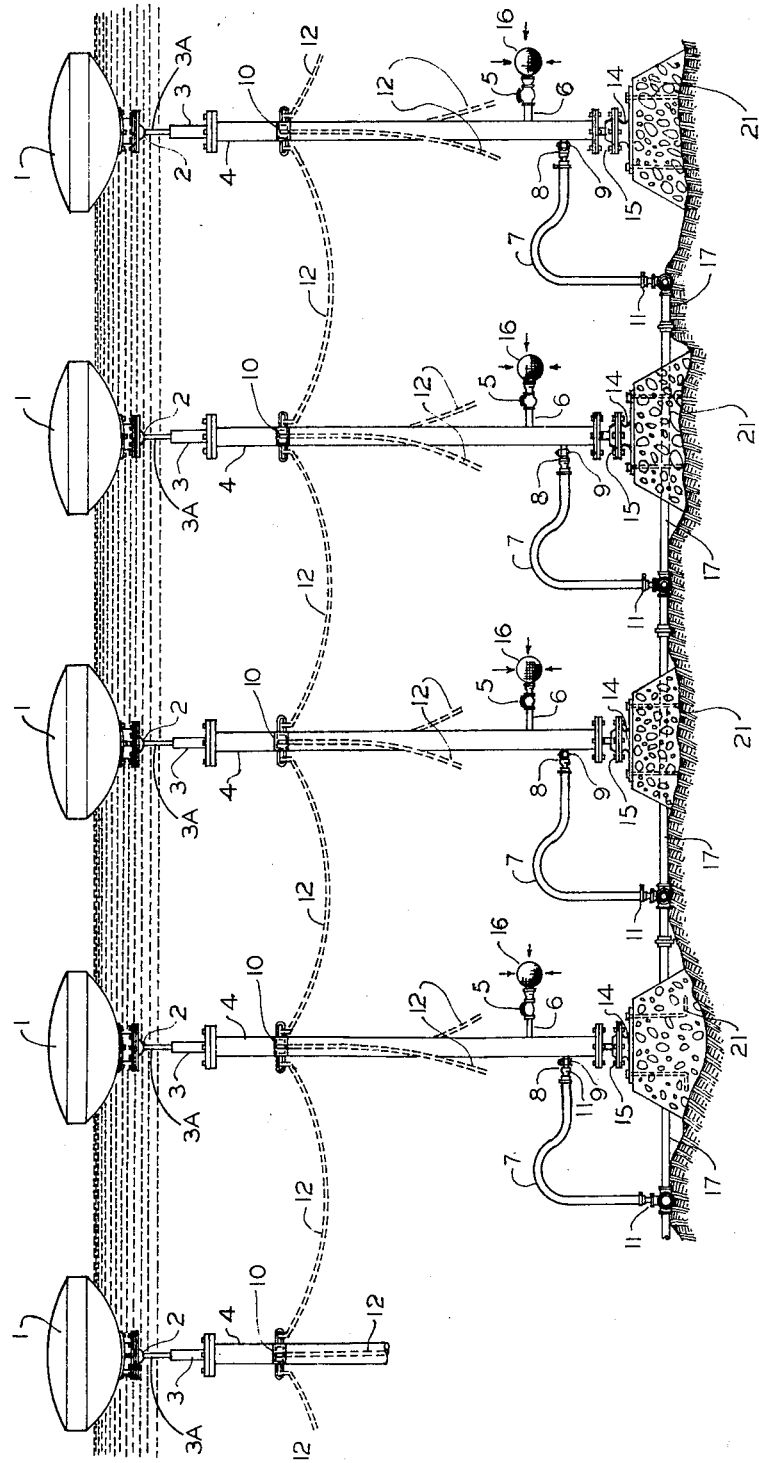
Figure 8:
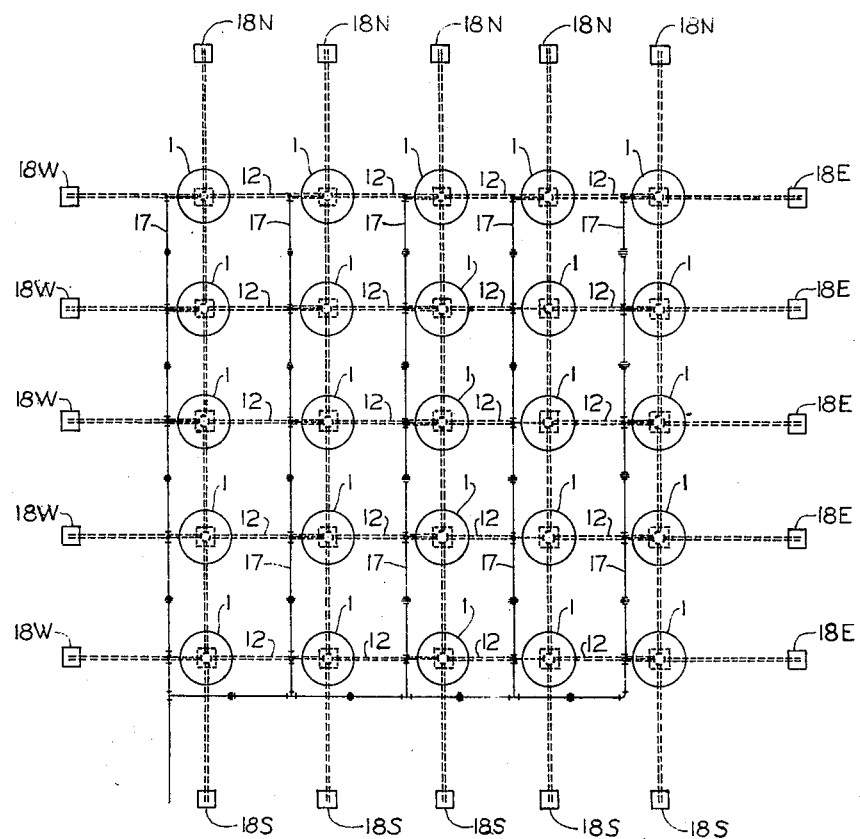
Figure 9:
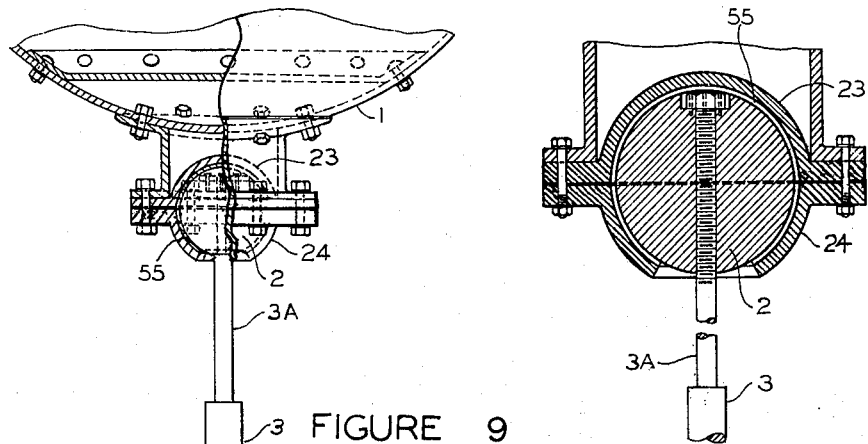
Figure 10:
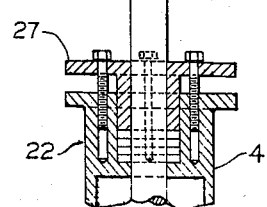
Figure 11:
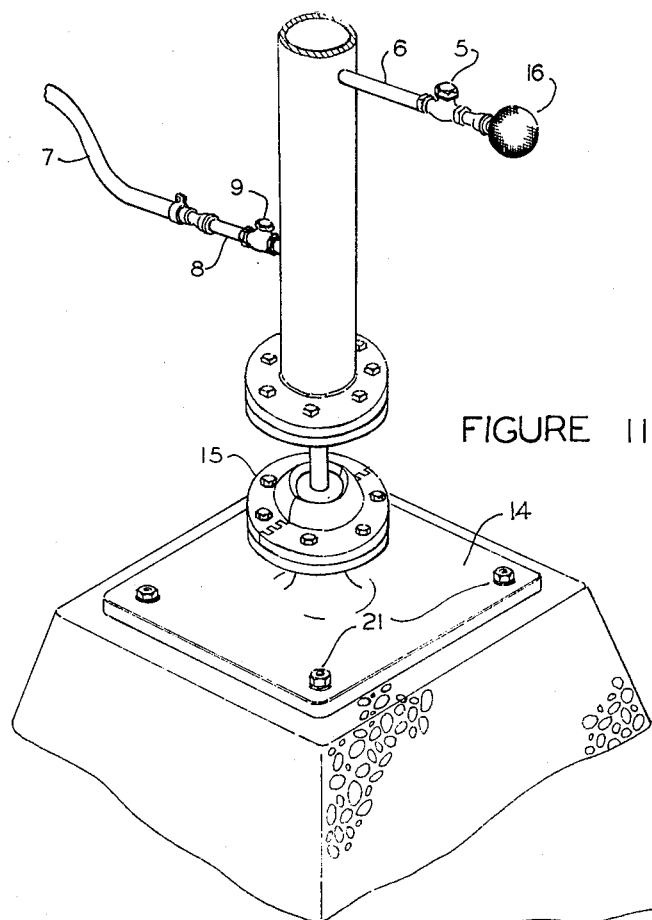
Figure 13:
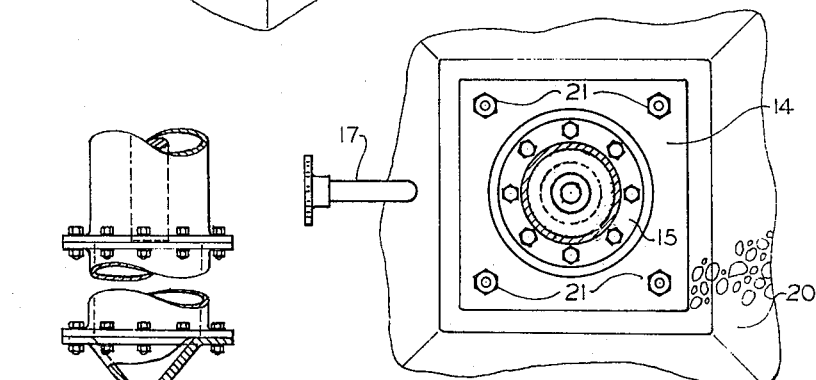

FIG. 6 shows in plan an individual ARRESTER an isolation while FIG. 8 shows a group of them similarly in plan or birds eye view. FIGS. 4 and 7 are lateral side elevations corresponding to FIGS. 6 and 8 which will help in understanding the latter.

It will be noticed that, with few exceptions, all mooring lines, in this application have been assigned identification assignments of 12N, 12E, 12S, and 12W, whilst their corresponding mooring bases have been made to bear identification assignments of 18N, 18E, 18S, and 18W. In short, the letters N, S, E, and W would seem to follow the nomenclature of their actual designations in the embodiment of their installations. Curiously, they have purposely been made to represent the initials designating the four cardinal directions, and points of the compass, namely North, South, East and West, although they might not actually coincide with the true cardinal points or even the corresponding magnetic points they represent. The designations are simply allegorical and have purposely been indicated in order to bring forth the idea that each adjoining line is squarely arranged with respect to the preceding and the following lines. What is meant here is that all the four mooring lines to the mooring bases can be imagined as meeting at the pump body of the HYDRO-UNDULATORY POWER ARRESTER from which they radiate invariably with an angle of 90 degrees between them.

Figure 5:
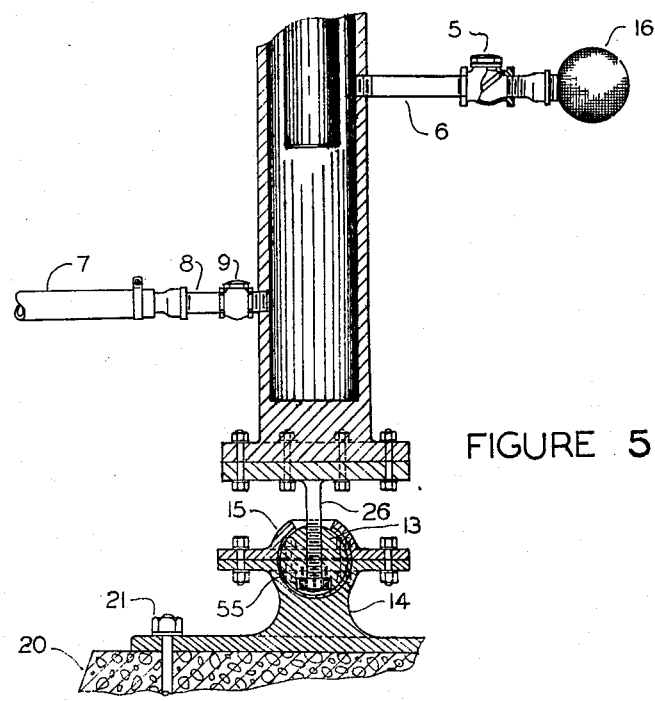

In the Plan View shown in FIG. 5, for instance, Mooring line 12E connecting the pump body of the HYDRO-UNDULATORY POWER ARRESTER to the corresponding foundation base 18E regardless of what it might happen to be, —chain or wire rope should ideally be ninety degrees or a quadrant of a circle distance from either one of the adjoining mooring lines, that is to say mooring line 12N connecting the pump body of the ARRESTER to the mooring base 18N, or mooring line 12S connecting the pump body of the ARRESTER of the mooring base 18S. Similarly, all the other lines connecting the pump bodies of all the ARRESTERS to either their corresponding mooring bases or between themselves shall angularly be spaced from each other, ninety degrees apart.

INDENTIFICATION OF PARTS OF THE OUTFIT APPEARING IN THE DRAWINGS

In order to fully understand the individual functions of each and everyone of the various parts of any one of our HYDRO-UNDULATORY (OR WATER WAVE) POWER ARRESTERS as described, whether installed and operating singly or collectively, a "summary list of the parts appearing in the drawings" is made part hereof albeit the inclusion of some of the parts do not appear at all throughout the entire specification. In this regard, some of the equipment and machinery which could well fall within the category of PRIOR ARTS, are featured in the drawings, because of their unavoidable relation with the novel outfits for which letters patent are herein being applied for, so as to make them serviceable to mankind.

With the foregoing sections of the specification reinforced by the aforementioned list of all the parts of our novel "HYDRO-UNDULATORY (OR WATER WAVE) POWER ARRESTER" as well as the drawings to which the descriptions of the parts refer, it is hoped that our disclosure in the within specification of our invention concerning "the harnessing of hydro-undulatory or water wave power" might be considered practically complete, clear enough to be fully understood as regards the projection concerning the expansion of the novel idea of building up hydrostatic (potential) energy as the expense of hydro-undulatory (or water wave) power, not only from the sea and large lakes, but perhaps in the foreseable future, even from oceans with favorable access from firm and stable lands or even islands thereby solving somehow some of the present day pressing problems concerning fuel shortage and environmental air pollution caused by the partial or incomplete combustion of fuels.

| Nos. of the Parts | Names of the Parts of our HYDRO-UNDULATORY POWER ARRESTERS inclusive of PRIOR ART EQUIPMENT of common knowledge pertaining to HYDRO-ELECTRIC POWER PLANTS operated by water supplied by the Arresters. |
|---|---|
| 1. | Floating vessel or buoy, conventional type in present current use. |
| 1-A. | Floating vessel or buoy redesigned and improved especially for HYDRO-UNDULATORY or water wave power detection and arrest. |
| 2. | Ball element or portion of the universal "ball-and-socket" joint where the "ball" is firmly fastened to the plunger ram 3 of the pumping attachment pertaining to the hydro-undulatory (or water wave) power arrester device, or to the connecting or extension rod 3A thereof, or directly to the top ball end of the Bellows Column type pump. |
| 3. | Piston of the hydro-undulatory (or water wave) power arrester plunger type pump. |
| 3-A. | Connecting or extension rod between the ball element of the "ball-and-socket joint" and the plunger of the hydro-undulatory (or water wave) power arrester. |
| 4. | Cylinder of the pumping attachment of the hydro-undulatory (or water wave) power arrester device |
| 5. | Check valve at intake opening to the pumping outfit of the hydro-undulatory (or water wave) power arrester. |
| 6. | Nipple protruding from the Pipe Cylinder of the Plunger reciprocating pump or alternatively the cylindrical base of the Bellows Column equipped Pump, both pertaining to the corresponding hydro-undulatory (or water wave) power arrester, for connection of water strainer 16, in order to exclude extraneous marine living matter swimming around, as well as undesirable, damaging solids suspended in the water, while the device is in operation. |
| 7. | Plastic-made flexible tube which connects the nipple protruding from the effluent or exit opening of the pumping attachment to the hydro-undulatory (or water wave) power arrester. |
| 8. | Close nipple between check valve 9 on the discharge or effluent end of the pipe cylinder of the pumping device pertaining to the hydro-undulatory (or water wave) power arrester and the adapter fitting to which flexible tubing is attached for delivery of the effluent to the main pipe 19 leading to the power plant installations on firm land beyond the seashore. |
| 9. | Check valve in the delivery, discharge or effluent end of the pumping element of the hydro-undulatory (or water wave) power arrester. |
| 10. | Sturdy rings at convenient points over and around the outside wall of pump Cylinder 4, at the upper end of the latter with rings or eyeholes for proper fastening of sturdy mooring chains or wire cables, with the understanding that all parts of the system are to be designed so as to be capable of resisting the most severe sea disturbances caused by hurricanes or typhoons i.e. in short bad weather in general. |
| 11. | Adapter fitting for the connection of flexible tubing 7, one end to the nipple of the effluent outlet emerging from the pipe cylinder 4 of the pumping outfit of the hydro-undulatory (or water wave) power arrester and the other end to the tributary pipeline 17 to which identical, flexible tubings from other similar power arresters are likewise attached, consolidating thereby the individual deliveries from each and every arrester into a single stream within main pipeline 19, for conductance to the power plant installations on firm land beyond the seashore line. |
| 12. | Mooring cables or chains intended to securely hold the hydro-undulatory or water wave power arrester either between themselves so as to act as a unit, or to terminal mooring posts or bases 18, in the bottom of the sea; each arrester being allowed to swing within limits, around its spherically shaped end or "ball" 13 held by socket halves 14 and 15 thereby resulting in the universal ball-and-socket joint at the bottom of the sea or lake, which in turn is securely bolted to a massive ferro-concrete foundation 20 pinpointing the location of the arrester. Aside from the designations of 12 to the lines, letters N, S, E, and W are appended to the identification numbers to distinguish the direction of the lines emanating from the HYDRO-UNDULATORY ARRESTER UNIT. The chains or cables of the line are not to be absolutely taut. They are to be loose enough to allow swinging of the arresters in group |

| Nos. of the Parts | Names of the Parts of our HYDRO-UNDULATORY POWER ARRESTERS inclusive of PRIOR ART EQUIPMENT of common knowledge pertaining to HYDRO-ELECTRIC POWER PLANTS operated by water supplied by the Arresters. |
|---|---|
| | under the influence of their respective Buoys or Floating vessels 1, whose movements are caused by the action of the water waves of the sea or lake, whichever be the case and will not be affected by variations of the depth due to the tides. |
| 13. | The ball element of the universal ball-and-socket joint at the bottom of the entire HYDRO-UNDULATORY (OR WATER WAVE POWER ARRESTER inclusive of the floating vessel or Buoy 1 as the latter is being pushed around and moved up and down due to the rolling and rocking movements caused by the waves of the sea or lake, wherever the arrester is installed. |
| 14. | The lower shell or main body portion of the socket element of the universal "ball-and-socket" joint which integrated in one piece with a base plate which holds it down to a solid massive foundation at the bottom of the sea or lake, supports the entire HYDRO-UNDULATORY POWER ARRESTER structure above it. |
| 15. | The upper cover or top shell of the socket element of the "ball-and-socket" joint at the base of the HYDRO-UNDULATORY (OR WATER WAVE) POWER ARRESTER set up as conceived for holding it duly anchored to its massive foundation at the bottom of the sea or lake, with a limited allowance to swing around, following action by the waves and tides thereupon. |
| 16. | Strainer-fitting the close nipple connected to the check valve 5 at the inlet end of the pump set with which the hydro-undulatory or water wave power arresters supply sea or lake water through the connecting water pipe mains 19 of the system to inland installations beyond the shoreline either for the generation of power or for serving fish ponds, industrial installations or for service to the general public in urban areas in such functions as for the supply of a secondary water system to urban communities. |
| 17. | Tributary pipes parallel to each other, into which the HYDRO-UNDULATORY (OR WATER WAVE) POWER ARRESTERS supply sea or lake water so as to feed the water main pipe 19 of the system leading to the inland installations beyond the shoreline mainly for the generation of power and perhaps industrial installations or for service to the general public such as for supply of a secondary water system to urban communities, or for supply to such new ventures as fish ponds or large aquaria for the caretaking of marine life in order to protect it against natural and traditional predators. |
| 18. | Mooring bases for safely holding with limited leeway, the cylinder of every plunger pump, essentially constituting a very necessary and important element of the entire HYDRO-UNDULATORY (OR WATER WAVE) POWER ARRESTER where Letters N, S, E, and W which actually stand for cardinal points of the compass, namely North, South, East and West although the appended letters to the numbers are merely allegorical, inasmuch as the designations of the letters do not actually follow the respective directions as indicated of the mooring lines or posts. |
| 19. | Rigid main pipe laid on the floor of the sea or lake for conveyance of the consolidated discharge from all the pumping elements of the HYDRO-UNDULATORY (OR WATER WAVE) POWER ARRESTERS as installed out anywhere in any particular area of the sea, or lake, to power plant installations inland way up upon good firm land beyond the shoreline of the sea or lake. |
| 20. | Massive ferro-concrete foundation holding down the base plate upon which a ball-and-socket Universal joint serves as pivotal points of a HYDRO-UNDULATORY (OR WATER WAVE) POWER ARRESTER allowing it to swing within limits about the joint mentioned. |
| 21. | Heavy duty bolts intended to hold down to the heavy duty ferro-concrete foundation, the base plate 14 whereupon the Universal Ball-and-Socket joint is incorporated. |
| 22. | Stuffing box on the top of the cylinder, designed for holding packing braids which upon being pressed would preclude as much as possible any leakage of the water being pumped. |
| 23. | The upper or main half of the socket element of the |

| Nos. of the Parts | Names of the Parts of our HYDRO-UNDULATORY POWER ARRESTERS inclusive of PRIOR ART EQUIPMENT of common knowledge pertaining to HYDRO-ELECTRIC POWER PLANTS operated by water supplied by the Arresters. |
|---|---|
| | "ball-and-socket" joint which connects plunger 3 or its extension 3A to the bottom of the hull of the Buoy 1 in order to allow free movement of the latter in response to the action of the waves thereupon. |
| 24. | Lower half of the socket case holding the ball of the Ball-and-Socket Universal joint upper half of which is identified with reference number 23. |
| 25. | one or more hydro-pneumatic tanks or pressure vessels. |
| 25A. | Reservoir on top of the hill or upon a mountain slope as an alternative to the use of hydro-pneumatic tanks or pressure vessels 25. |
| 26. | Reducer fitting as means of connection of the "ball-and-socket" Universal joint to the extra heavy duty pipe cylinder 4 of the pumping element of the hydro-undulatory (or water wave) power arrester solely serving therefore as a structural support of said pumping element. |
| 27. | Adjustable head fitting which will press upon the textile square sectional braid packings within the stuffing box at the head or top of each cylinder through which plunger moves up and down so as to preclude any possible leakage between the plunger and the cylinder in the process of pumping. |
| 28. | Sturdy connecting Nipple for flow-conducting as well as for support by the "ball-and-socket" Universal Joint of the extra heavy duty pipe cylinder of the pumping attachment of HYDRO-UNDULATORY (OR WATER WAVE) POWER ARRESTER, intended therefor to simultaneously serve as structural support of the ARRESTER as well as passageway of the effluent delivered by said device thereby precluding the use of the flexible tubing 7 which could perhaps easily suffer destruction by marine creatures. |
| 29. | One way, check or retainer valves provided all along the main pipe to conventional hydro-electric installations on firm land beyond the shoreline with the view to securing uni-directional water flow within the main pipe line 19. The valves are actually essential in the operation as means for retaining the flow in the reversals of movement of the Plunger, thereby resulting in a pulsating flow from the HYDRO-UNDULATORY (OR WATER WAVE) POWER ARRESTER in its function of water pumping from the lake or sea wherever it happens to be installed to either or both the hydro-pneumatic tanks 25 or Open reservoir 25A in the slopes of an adjoining hill or mountain slope. |
| 30. | Extension pipeline to reservoir 35A up in the slopes of a mountain whereupon a reservoir would be erected as an alternative to the exclusive use of hydro-pneumatic tanks or pressure vessels 25 which apparently would result in a great reduction of the investment and consequently offer the most attractive and lowest price of energy produced. |
| 31. | MANHOLE upon the deck of the New BUOY 1-A at the very Center or midpoint thereof, through which the necessary ballast called for could be inserted and safely placed in a cavity provided therefor at the bottom of the hull thereof, in order to secure the most effective and the highest possible efficiency of performance of said BUOY. |
| 32. | MANHOLE COVER provided with plunger arranged for pressing its gasket 32A against the surface of flange of MANHOLE 31. |
| 32-A. | A GASKET to be placed in-between the flange of Manhole 31 and the flange of MANHOLE Cover 32 in order to secure absolutely water tightening of the point. |
| 33. | The protuberance or bulge seen outside the BUOY 1-A corresponding to the hollow cavity 36 therewithin from where the socket halves of a "ball and socket joint" are fastened for admission of the "ball" 2 of the joint, fastened to the end of connecting rod 3-A attached to the plunger 3 of the hydro-undulatory water wave power arrester pump. |
| 34. | Bolts hinged all around the manhole flange, ready for swinging or turning around for insertion into the slots of the manhole cover gasket and manhole cover proper in preparation for tightening the nuts thereto corresponding. |
| 34-A. | Nuts corresponding to the swinging Bolts 34 which upon tightening will cause the Manhole cover flange 32 |

| Nos. of the Parts | Names of the Parts of our HYDRO-UNDULATORY POWER ARRESTERS inclusive of PRIOR ART EQUIPMENT of common knowledge pertaining to HYDRO-ELECTRIC POWER PLANTS operated by water supplied by the Arresters. |
|---|---|
| | to press Gasket 32A against the flange of Manhole 31. |
| 35. | Bolt nuts, preferably of the castellated type, duly attached to their corresponding bolts and-checked so as not to go further than the tips of the latter in order to be ready for immediate tightening after the bolts have been proper swung and inserted into the slots provided in the flange of manhole cover 32 and perhaps the gasket 32A included therewith. |
| 36. | Space within the Hollow Cavity corresponding to the Bulge or Protuberance 33 serving as storage for ballast loaded or removed through Manhole 31 in order to secure the necessary weight of the Buoy and attachments thereto for the proper functioning of the HYDRO-UNDULATORY POWER ARRESTER. |

The foregoing is an outline and a full description of our herein invention concerning the utilization of Water Wave Power for the conversion, of the kinetic energy representing said power into hydrostatic or water potential energy which upon release under control could or would be converted back into mechanical and electrical power through the use of PRIOR ART means pertaining to the development of high head hydro-electrical power plants.

While there might have apparently been attempts towards the utilization of water wave power for the generation of electricity for the necessities of Modern Man, nevertheless we are fully aware and convinced that none of the propositions or plans contrived or presented so far have the simplicity and effectiveness of performance that we have conceived such as we have recited and described herein.

Moreover, prior to our herein scheme as outlined, the harnessing of power from rivers and streams and lakes or even from the sea itself, when taking advantage of tidal phenomena and influence, has been dependent only upon conditions which Nature offers.

No efforts have ever been exerted towards economically counteracting gravitational effects upon liquids with the view in reproducing natural hydraulic potentials generally believed to be absolutely non existent in water after having finally settled at its lower-most natural level, which is the sea.

We therefore claim the following:

1. In a system for punping water by wave action having a floating buoy, means to anchor the buoy, a pump disposed between the buoy and the anchor means, said pump having a piston actuated by movements of the buoy to pump water, the improvement comprising, said buoy shaped to orient itself for vertical motion without substantial pitching to wave action in any direction having a shallow dish shaped underbody with circular water lines throughout its entire immersed depth, a central protuberance in the lower center of said underbody having an area for the placement of ballast, wherein a vertical cross-section through the center of said buoy defines a symmetrical buoy hull shape, and a universal joint coupling said protuberance to said pump.

2. The system of claim 1 wherein said area inside said protuberance for the placement of ballast is defined by an internal wall having a recess extending into said protuberance.

3. The system of claim 2 including a removable cover on the buoy, said cover disposed on that portion of the buoy disposed above the water level, said cover providing access to the interior of said buoy for placement of ballast in said area.

4. The system of claim 1 wherein said univeral joint coupling said protuberance in a ball and socket universal joint, the ball coupled to a piston rod of said pump and a second ball and socket universal joint disposed between the housing of said pump and said anchor means.

5. The system of claim 4 wherein lignum vitae is placed between the ball and socket of said second joint.

6. The system of claim 1 wherein at least twenty-five buoys are arranged in a grid-matrix, said grid defined by four lines of mooring means, means coupling said buoys to each adjacent buoy and to said mooring means and output means coupling the pumps from each buoy to generate a common water output from said grid.

7. The system of claim 6 wherein the means coupling said buoys to said mooring means and each adjacent buoy is a chain, said chain connected to the pump associated with each buoy.

* * * * *